(12) United States Patent
Chuang

(10) Patent No.: US 6,425,677 B1
(45) Date of Patent: Jul. 30, 2002

(54) ILLUMINATING APPARATUS USING MULTIPLE LIGHT SOURCES

(75) Inventor: Fu-Ming Chuang, Hsin-Chu Hsien (TW)

(73) Assignee: Prokia Technology Co., Ltd. (TW)

( * ) Notice: Subject to any disclaimer, the term of this patent is extended or adjusted under 35 U.S.C. 154(b) by 0 days.

(21) Appl. No.: 09/789,970

(22) Filed: Feb. 20, 2001

(51) Int. Cl.[7] ................................................. F21V 13/08
(52) U.S. Cl. ........................ 362/243; 362/241; 362/247
(58) Field of Search ................................ 362/243, 583, 362/227, 247, 253–235, 245, 268, 27, 555, 33, 302, 299, 551, 241, 242

(56) References Cited

U.S. PATENT DOCUMENTS

| | | | | |
|---|---|---|---|---|
| 4,651,257 A | * | 3/1987 | Gehly | 362/33 |
| 5,597,231 A | * | 1/1997 | Rosset | 362/241 |
| 5,754,278 A | * | 5/1998 | Kurtz | 362/268 |
| 5,951,139 A | * | 9/1999 | Smith et al. | 362/241 |
| 6,205,271 B1 | * | 3/2001 | Bowron et al. | 362/551 |

* cited by examiner

*Primary Examiner*—Sandra O'Shea
*Assistant Examiner*—Bao Truong
(74) *Attorney, Agent, or Firm*—Webb Ziesenheim Logsdon Orkin & Hanson, P.C.

(57) ABSTRACT

An illuminating apparatus that utilizes a plurality of light sources to generate bright input light for a projection display. The apparatus includes a lighting unit, a first reflector having a central region formed with an opening, a peripheral region around the central region for reflecting light from a plurality of lighting members to converge rearwardly, a second reflector disposed behind the first reflector and facing the opening in the first reflector, such that the light rays pass through the opening in the first reflector, and an integrator disposed in front of the first reflector to receive the light rays which passed through the opening in the first reflector.

13 Claims, 3 Drawing Sheets

ILLUMINATING APPARATUS USING MULTIPLE LIGHT SOURCES

BACKGROUND OF THE INVENTION

1. Field of the Invention

The invention relates to an illuminating apparatus for a liquid crystal projection display, more particularly to an illuminating apparatus that utilizes a plurality of light sources to generate input light for a projection display.

2. Description of the Related Art

In a conventional liquid crystal projection display, input light is separated into color components that are modulated and subsequently recombined to generate an image output. A single light source is commonly used to generate the input light in the conventional projection display. For projection displays with a high requirement of brightness, the single light source will incur a corresponding increase in power requirement. High-power single light sources are disadvantageous in that there is a severe heat dissipation problem that is difficult to resolve when such light sources are in use.

SUMMARY OF THE INVENTION

The object of the present invention is to provide an illuminating apparatus that utilizes a plurality of light sources to generate bright input light for a projection display.

According to the present invention, an illuminating apparatus comprises:

a lighting unit including a plurality of lighting members that are spaced apart from each other and that are operable so as to produce forwardly directed parallel light rays;

a first reflector disposed in front of the lighting unit and having a central region formed with an opening, and a peripheral region around the central region and formed with a first reflecting surface that confronts the lighting unit and that reflects the forwardly directed parallel light rays from the lighting members to converge rearwardly;

a second reflector disposed behind the first reflector and registered with the central region of the first reflector, the second reflector being formed with a second reflecting surface that faces the opening in the first reflector such that the light rays reflected from the first reflecting surface are further reflected by the second reflecting surface so as to pass through the opening in the first reflector; and an integrator disposed in front of the first reflector and having an incident end disposed proximate to the opening in the first reflector to receive the light rays that pass through the opening, and a radiating end disposed opposite to the incident end.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
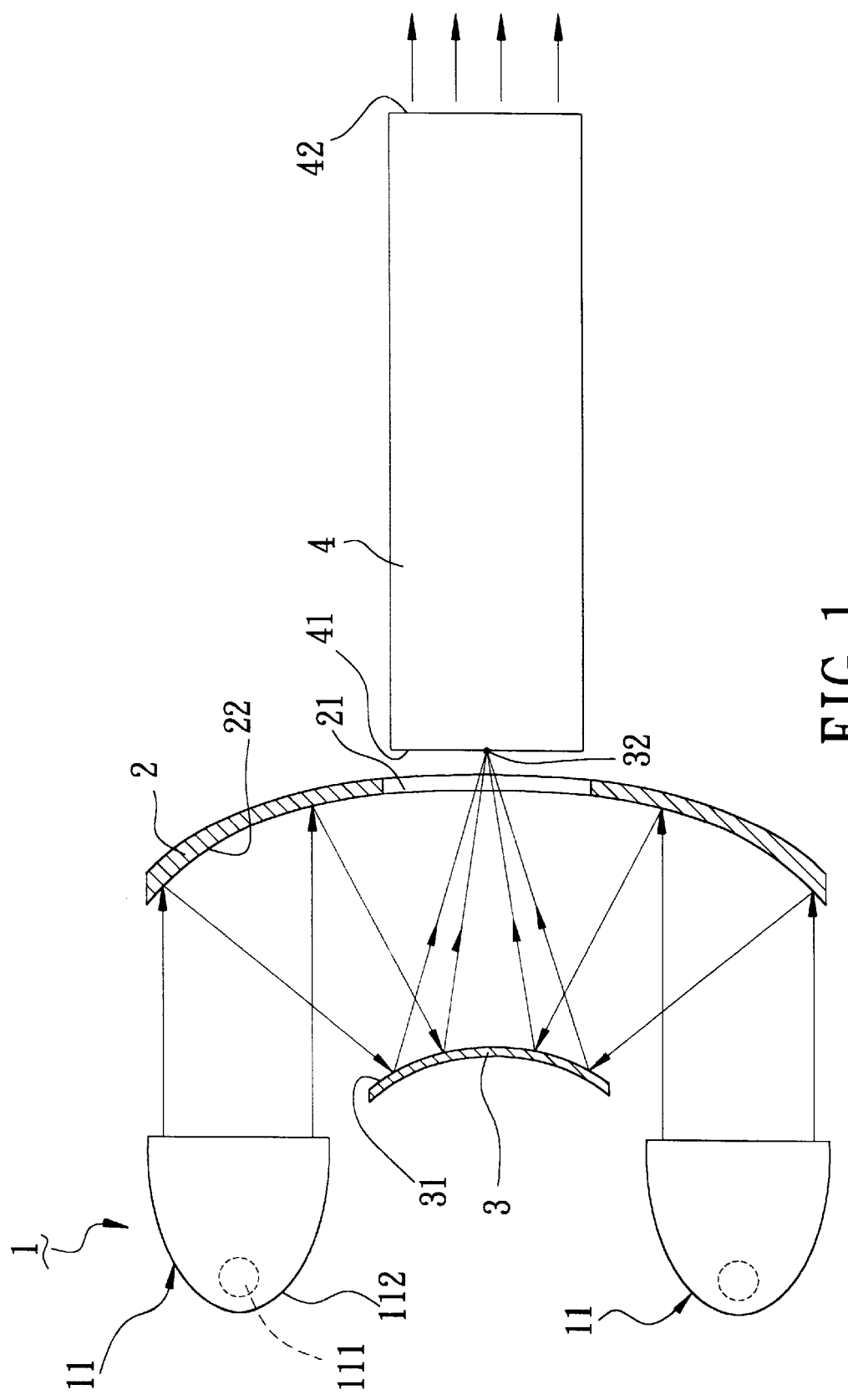
FIG. 1 is a partly sectional schematic side view of the first preferred embodiment of an illuminating apparatus according to the present invention.
Figure 2:
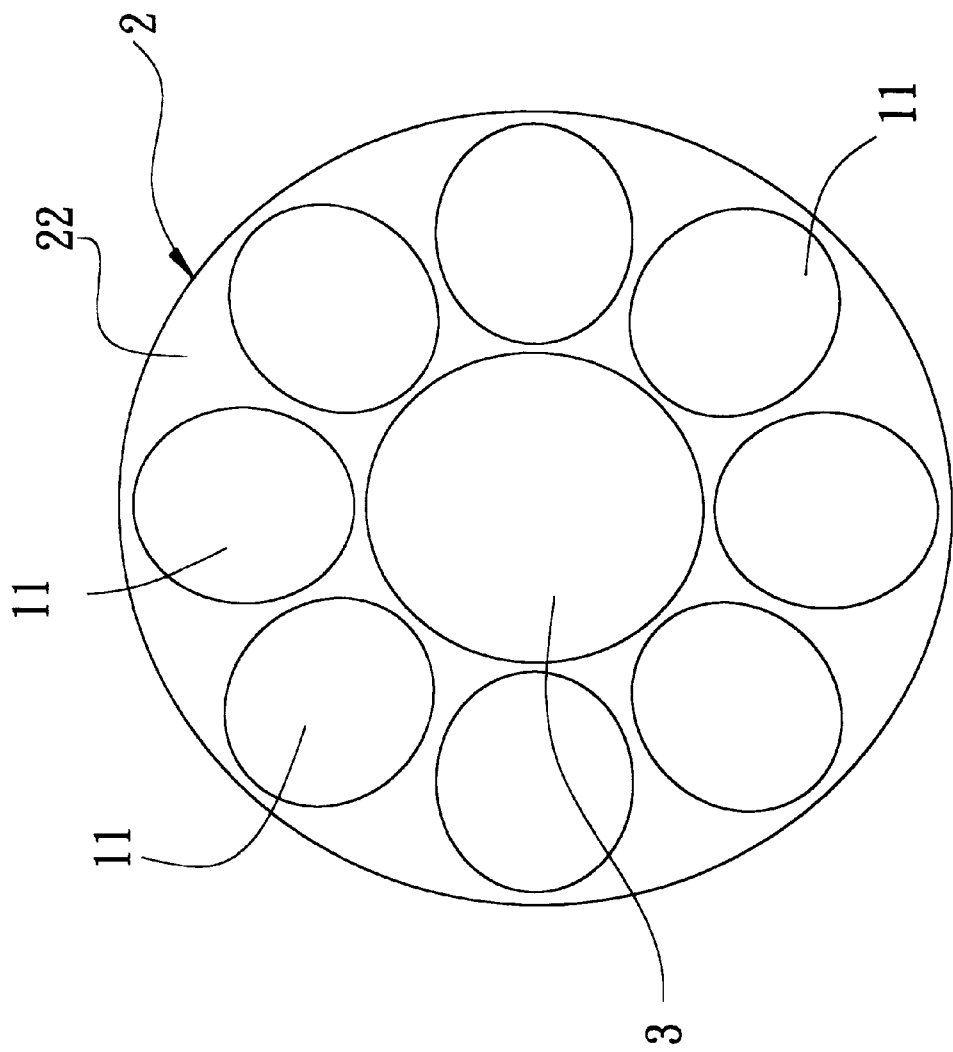
FIG. 2 is a schematic rear end view of the first preferred embodiment.

Referring to FIGS. 1 and 2, the first preferred embodiment of an illuminating apparatus according to the present invention is shown to comprise a lighting unit 1, a first reflector 2, a second reflector 3, and an integrator 4.

The lighting unit 1 includes a plurality of lighting members 11 that are arranged in a ring formation and that are angularly spaced apart from each other. Each lighting member 11 includes a light source 111 and a parabolic reflector 112 for reflecting light rays that radiate from the light source 111 to produce forwardly directed parallel light rays.

The first reflector 2 is disposed in front of the lighting unit 1, and has a central region formed with an opening 21, and a peripheral region around the central region and aligned with the lighting members 11. The peripheral region is formed with a curved first reflecting surface 22, such as a convex reflecting surface, that confronts the lighting unit 1 and that reflects the forwardly directed parallel light rays from the lighting members 11 to converge rearwardly.

The second reflector 3 is disposed behind the first reflector 2 and is registered with the central region of the first reflector 2. The second reflector 3 is formed with a curved second reflecting surface 31, such as a convex reflecting surface, that faces the opening 21 in the first reflector 2 such that the light rays reflected from the first reflecting surface 22 are further reflected by the second reflecting surface 31 so as to pass through the opening 21. In this embodiment, the second reflecting surface 31 cooperates with the first reflecting surface 22 such that the light rays passing through the opening 21 converge at a point 32 that is in front of the first reflector 2. Note that the second reflector 3 has a size sufficient so as not to block passage of the forwardly directed parallel light rays from the lighting members 11 to the peripheral region of the first reflector 2.

The integrator 4 is disposed in front of the first reflector 2, and has an incident end 41 disposed proximate to the opening 21 in the first reflector 2 to receive the light rays that pass through the opening 21, and a radiating end 42 opposite to the incident end 41. The integrator 4, which has the incident and radiating ends 41, 42 thereof aligned with the opening 21 in the first reflector 2 about an optical axis, may be formed as a glass cylinder, or as a hollow cylinder having an inner wall surface coated with a reflective film. The point 32, where the light rays passing through the opening 21 converge, coincides with the incident end 41 of the integrator 4. Input light for a liquid crystal projection display (not shown) can be obtained from the radiating end 42.

Because the high power of the lighting unit 1 is distributed among the lighting members 11, the heat dissipation problem commonly encountered with the use of a high-power single light source as taught in the prior art can be easily overcome.

Figure 3:
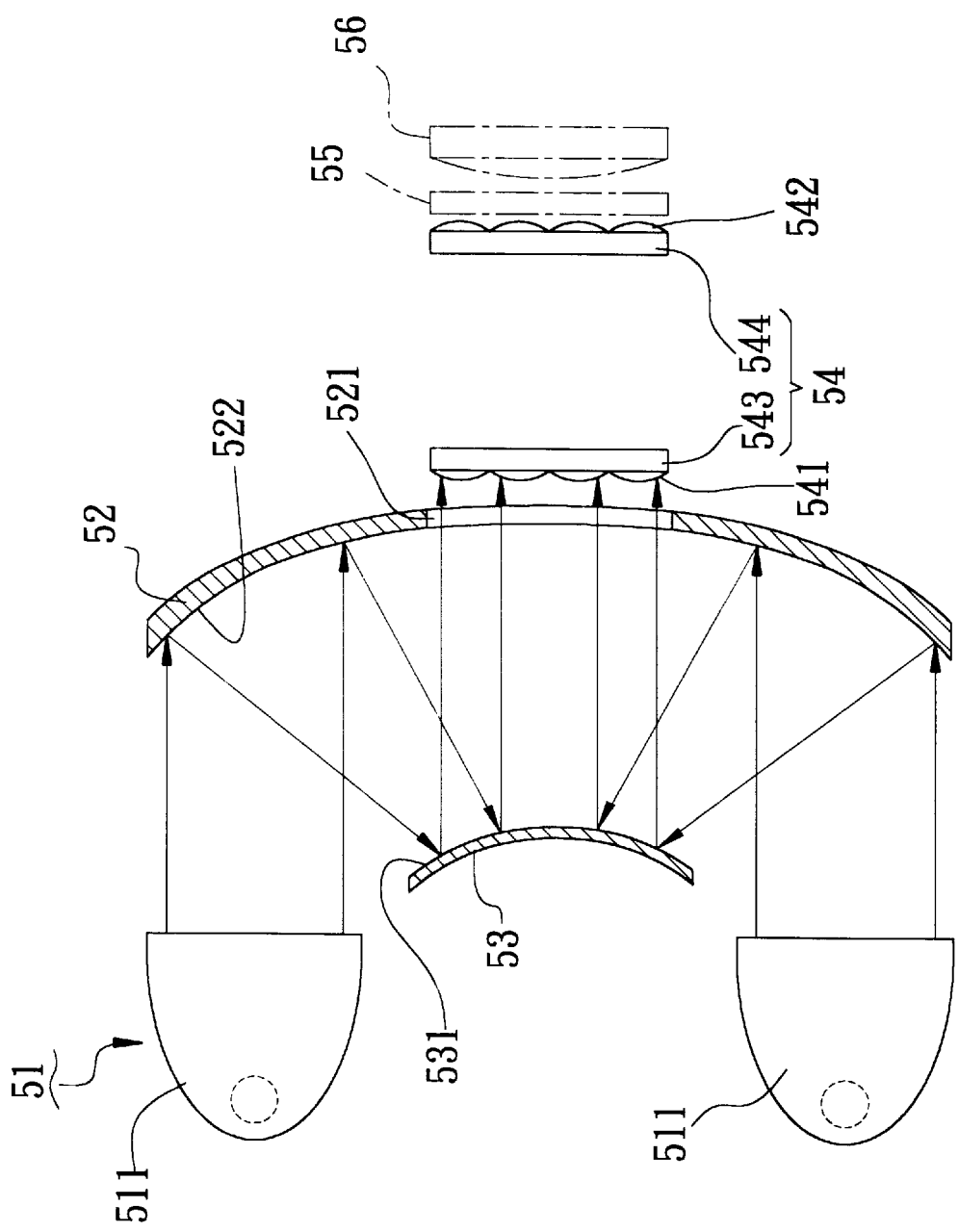
FIG. 3 is a partly sectional schematic side view of the second preferred embodiment of an illuminating apparatus according to the present invention.

Referring to FIG. 3, the second preferred embodiment of an illuminating apparatus according to the present invention is shown to comprise a lighting unit 51, a first reflector 52, a second reflector 53, and an integrator 54.

The lighting unit 51 is similar to the lighting unit 1 of the previous embodiment, and includes a plurality of lighting members 511.

The first reflector 52 is disposed in front of the lighting unit 51, and has a central region formed with an opening 521, and a peripheral region around the central region and formed with a curved first reflecting surface 522 that confronts the lighting unit 51 and that reflects forwardly directed parallel light rays from the lighting members 511 to converge rearwardly.

The second reflector 53 is disposed behind the first reflector 52 and is registered with the central region of the first reflector 52. The second reflector 53 is formed with a curved second reflecting surface 531 that faces the opening 521 in the first reflector 52 such that the light rays reflected from the first reflecting surface 522 are further reflected by the second reflecting surface 531 so as to pass through the opening 521 in the first reflector 52. In this embodiment, the second reflecting surface 531 cooperates with the first reflecting surface 522 such that the light rays reflected by the second reflecting surface 531 are parallel to each other as they pass through the opening 521 in the first reflector 52.

The integrator 54 is disposed in front of the first reflector 52, and has an incident end 541 disposed proximate to the opening 521 in the first reflector 52 to receive the light rays that pass through the opening 521, and a radiating end 542 opposite to the incident end 541. The integrator 54, which has the incident and radiating ends 541, 542 thereof aligned with the opening 521 in the first reflector 52 about an optical axis, includes front and rear array-type integration lenses 544, 543 that are spaced apart from each other along the optical axis and that are formed respectively with the radiating and incident ends 542, 541. Input light for a liquid crystal projection display (not shown) can be obtained from the radiating end 542.

Like the previous embodiment, because the high power of the lighting unit 51 is distributed among the lighting members 511, the heat dissipation problem commonly encountered with the use of a high-power single light source as taught in the prior art can be easily overcome.

Preferably, a filter 55 is disposed in front of the integrator 54 to remove ultraviolet and infrared light rays. A focusing lens 56 can be additionally disposed in front of the filter 55.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An illuminating apparatus comprising:
   a lighting unit including a plurality of lighting member, said lighting members are spaced apart from each other and are operable so as to produce forwardly directed parallel light rays;
   a first reflector disposed in front of said lighting unit and having a central region formed with an opening, and a peripheral region around said central region and formed with a first reflecting surface, said first reflecting surface confronts said lighting unit and reflects the forwardly directed parallel light rays from said lighting members to converge rearwardly;
   a second reflector disposed behind said first reflector and registered with said central region of said first reflector, said second reflector being formed with a second reflecting surface, said second reflecting surface faces said opening in said first reflector such that the light rays reflected from said first reflecting surface are further reflected by said second reflecting surface so as to pass through said opening in said first reflector; and
   an integrator disposed in front of said first reflector and having an incident end disposed proximate to said opening in said first reflector to receive the light rays which passed through said opening, and a radiating end disposed opposite to said incident end.

2. The illuminating apparatus of claim 1, wherein said lighting members are arranged in a ring formation and are angularly spaced apart from each other.

3. The illuminating apparatus of claim 2, wherein said lighting members are aligned with said peripheral region of said first reflector.

4. The illuminating apparatus of claim 3, wherein said second reflector has a size sufficient so as not to block passage of the forwardly directed parallel light rays from said lighting members to said peripheral region of said first reflector.

5. The illuminating apparatus of claim 1, wherein each of said lighting members includes a light source and a parabolic reflector for reflecting light rays that radiate from said light source to produce the forwardly directed parallel light rays.

6. The illuminating apparatus of claim 1, wherein said second reflecting surface cooperates with said first reflecting surface such that the light rays passing through said opening converge at a point that is in front of said first reflector and that coincides with said incident end of said integrator.

7. The illuminating apparatus of claim 6, wherein said integrator is formed as a glass cylinder.

8. The illuminating apparatus of claim 7, wherein said incident and radiating ends of said integrator are aligned with said opening in said first reflector about an optical axis.

9. The illuminating apparatus of claim 6, wherein said integrator is formed as a hollow cylinder having an inner wall surface coated with a reflective film.

10. The illuminating apparatus of claim 9, wherein said incident and radiating ends of said integrator are aligned with said opening in said first reflector about an optical axis.

11. The illuminating apparatus of claim 1, wherein said second reflecting surface cooperates with said first reflecting surface such that the light rays reflected by said second reflecting surface are parallel to each other as they pass through said opening in said first reflector.

12. The illuminating apparatus of claim 11, wherein said incident and radiating ends of said integrator are aligned with said opening in said first reflector about an optical axis.

13. The illuminating apparatus of claim 12, wherein said integrator includes front and rear array-type integration lenses, said lenses are spaced apart from each other along the optical axis and are formed respectively with said radiating and incident ends.

* * * * *